United States Patent [19]

Kraus

[11] 4,322,787
[45] Mar. 30, 1982

[54] CLOSED LOOP LOW VOLTAGE UP-CONVERTER

[75] Inventor: Richard A. Kraus, Canton, Mich.

[73] Assignee: Ford Motor Company, Dearborn, Mich.

[21] Appl. No.: 192,574

[22] Filed: Sep. 30, 1980

[51] Int. Cl.³ .............................. H02M 3/335
[52] U.S. Cl. ........................... 363/21; 323/222; 323/224; 323/266
[58] Field of Search .......... 323/222, 224, 226, 273, 323/266, 274; 363/19, 20, 21, 18

[56] References Cited

U.S. PATENT DOCUMENTS

| | | | |
|---|---|---|---|
| 2,832,035 | 4/1958 | Bruck et al. | 323/273 |
| 3,639,826 | 2/1972 | Grundberg | 363/19 |
| 3,818,306 | 6/1974 | Marini | 323/266 X |
| 3,842,589 | 10/1974 | Luce et al. | 323/222 X |
| 3,974,439 | 8/1976 | Holland | 323/222 |
| 4,224,659 | 9/1980 | Iguchi | 363/20 |

Primary Examiner—William M. Shoop
Attorney, Agent, or Firm—Paul K. Godwin, Jr.; Clifford L. Sadler

[57] ABSTRACT

A DC voltage up-converter circuit having an inductor in series between the relatively low value of DC voltage and the stepped up output of the circuit, wherein the output end of the inductor is periodically switched to ground potential and an output storage capacitor stores the energy surges which result when the ground connection is disconnected. The cathode of a zener diode is connected to the output to provide a limit to the output of the circuit and the anode of the zener diode is connected to means for control limiting the amount of current through the switching means when said ground potential is connected.

3 Claims, 7 Drawing Figures

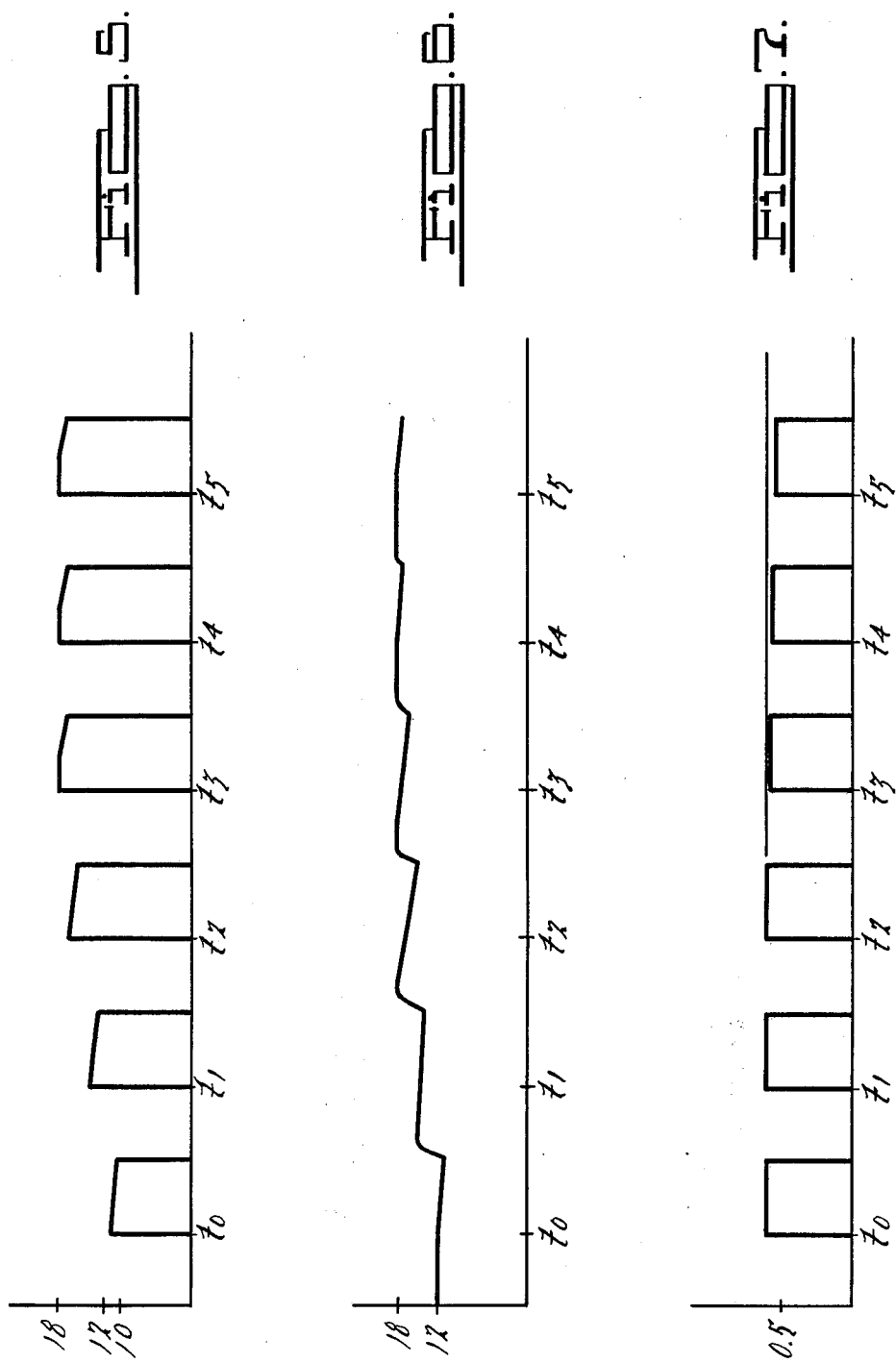

CLOSED LOOP LOW VOLTAGE UP-CONVERTER

BACKGROUND OF THE INVENTION

1. Field of the Invention

The present invention is directed to the field of converter circuits which increase DC voltage levels and more particularly to improvements therein.

BRIEF DESCRIPTION OF THE DRAWINGS

FIG. 5 is a waveform diagram illustrating the switching voltage applied to terminal 3 of the up-converter circuit over the first few cycles of operation.

FIG. 6 is a waveform diagram illustrating the output voltage of a typical up-converter circuit over the first few cycles of operation.

FIG. 7 is a waveform diagram illustrating the switching voltage present at the base of the control transistor 240 of FIG. 3 over the first few cycles of operation.

DESCRIPTION OF THE PRIOR ART

Figure 1:
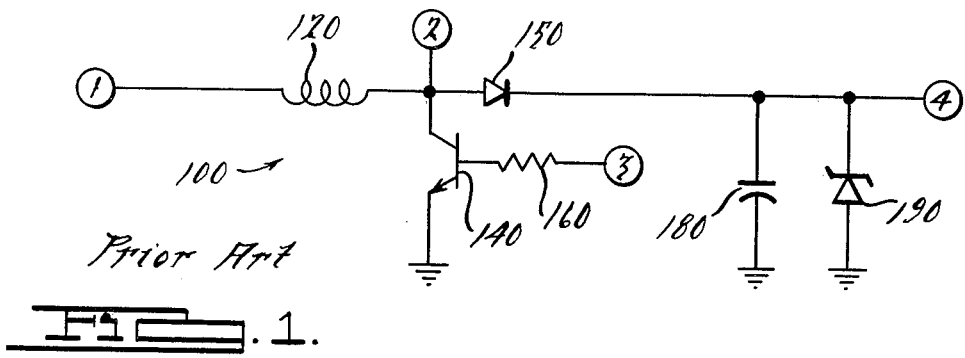
FIG. 1 is a schematic of a prior art up-converter circuit.
Figure 2:
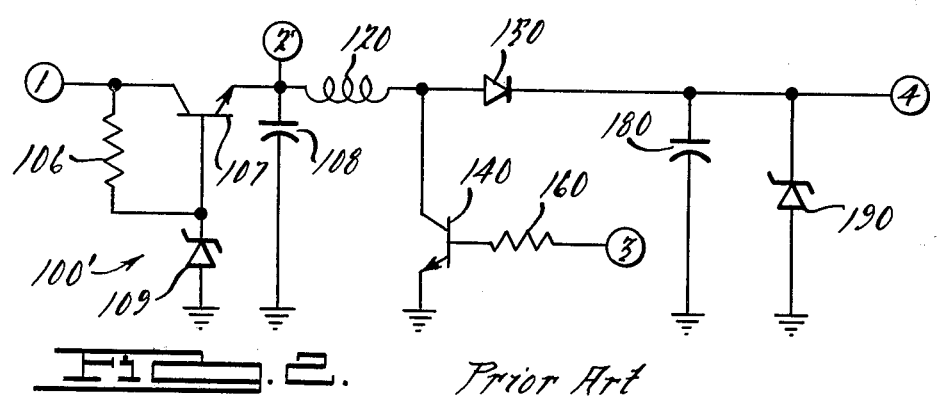
FIG. 2 is a schematic of a prior art up-converter circuit containing a series regulator.

Two distinct prior art up-converter circuits are shown in FIGS. 1 and 2 of the accompanying drawings. These prior art circuits each function in a similar manner. In each of these circuits, an input voltage of approximately 14 volts is stepped up to a level of approximately 18 volts so as to supply auxiliary circuitry. An example of auxiliary circuitry is an electronic clock that contains logic circuitry which may accurately perform time keeping functions when supplied with a voltage in a range of volts DC, and an associated vacuum fluorescent display which requires voltage levels in the range of 18-24 volts. These circuits are generally used in automotive applications wherein the supply voltage from a 12 volt storage battery is supplied continuously to the clock circuit for the purpose of maintaining the time keeping function. Upon ignition of the vehicle engine, the DC voltage increases to approximately 14 volts and the clock circuit supplies a periodic modulation signal to its associated display circuitry and an output terminal. The up-converter circuit is in series between the DC voltage source and the clock circuit and is activated by the periodic modulation signal to produce an output of approximately 18 volts driving the vacuum fluorescent display and continuing the time keeping function.

The up-converter 100, shown in FIG. 1, is an unregulated type wherein the DC voltage is supplied at terminal 1 to an inductor 120. The other side of the inductor is connected to a junction 2, as is the anode of the diode 150. The cathode of the diode 150 is connected to an output terminal 4. A capacitor 180 and a zener diode 190 are connected in parallel between the junction of the cathode of the diode 150 to the output terminal 4 and ground. The zener diode 190 is selected to have a threshold breakdown voltage value which is equal to that desired to be supplied out of the circuit on terminal 4. A transistor 140 provides a collector-emitter path between the junction 2 and ground, when activated.

The base of the transistor 140 is connected across a resistor 160 to an input terminal 3. The input terminal 3 receives the periodic modulation signal from the clock circuit when the ignition "ON" state is sensed. In this case, the periodic modulation signal is a square wave signal, having a 50% duty cycle and a frequency of approximately 65 KHz, input to terminal 3.

Prior to ignition of the vehicle engine, a voltage level of 12 volts DC is applied to terminal 1 directly from the storage battery of the vehicle. Negligible voltage drop is realized across the inductor 120 during this steady state condition and approximately 12 volts is output at the terminal 4 see FIG. 6 at time prior to "$t_0$". At this time, no modulation signal is present on terminal 3, and the transistor 140 maintains a high resistance to ground state for junction 2. The output voltage of approximately 12 volts is fed to the logic circuitry of the clock so that it may continue the time keeping function without an activated display.

When the ignition switch of the vehicle is turned on at "$t_0$", a 65 KHz periodic signal is generated within the clock circuit and is input to terminal 3 of circuit 100 (see FIG. 5). Although this modulation signal of FIG. 5 is constant in terms of frequency, and duty cycle (approximately 50%) it is amplitude dependent upon the output voltage at terminal 4. When the vehicle engine is running, the alternator ideally provides a DC supply voltage of approximately 14 volts to terminal 1. Periodic switching of transistor 140 causes the voltage level at junction 2 to correspondingly rise and fall. However, when the transistor 140 switches from a low resistance state to a high resistance state (e.g. half way between "$t_0$" and "$t_1$" in FIG. 5), the voltage at junction 2 surges upwards above its normal steady state level due to the inductor 120. This surge of voltage is felt across the diode 150 and current is conducted into the capacitor 180 (see corresponding time in FIG. 6). During the occurrence of the low resistance path across transistor 140, the diode 150 is reverse biased and the capacitor 180 supplies some charge to the output terminal. This is evidenced by the gradual downward slope of the FIG. 6 waveform between low to high resistance switching cycles. The capacitor 180 is of a sufficient value that it will not discharge between cycling periods of the transistor 140. The capacitor 180 continues to accumulate more charge than it can dissipate between cycles until the "$t_5$" cycle, when the breakdown threshold value of zener diode 190 is reached. At that point, the waveform at terminal 4 appears relatively level.

FIG. 6 illustrates the voltage level at terminal 4 over the first few cycles of operation until the breakdown threshold value of the zener diode 190 is reached. In that figure, the breakdown value is 18 volts.

The prior art circuit 100' shown in FIG. 2 is substantially identical to the circuit 100 shown in FIG. 1, except that the circuit shown in FIG. 2 includes a series regulator between the DC input terminal 1 and the inductor 120. The series regulator includes a regulating transistor 107 which supplies a collector-emitter path between the terminal 1 and the junction point 2' at inductor 120. A 12 volt zener diode 109 is connected to the base of the transistor 107 and has its anode connected to ground. Base to collector biasing is achieved through resistor 106, which is connected therebetween. The regulator circuit functions to provide a relatively stable 12 volts to the inductor 120 and protects the power supply against surges.

Both prior art circuits 100 and 100' respectively shown in FIGS. 1 and 2 operate most efficiently when the voltage applied at terminal 1 is just enough to move zener diode 190 into its zener knee. Any input voltage at terminal 1 in excess of that required to produce the zener breakdown results in power being dissipated by the zener. Of course, dissipated power causes heat to be generated and absorbed by other components in the circuit.

A more severe problem occurs when the input voltage at terminal 1 is greater than the optimum circuit design voltage. As the voltage at terminal 1 increases, the apparent load impedance at output terminal 4 decreases. This means that when transistor 140 is turned off, the inductor 120 delivers more energy than normal to the load, zener diode 190 and capacitor 180. On the other hand, when transistor 140 turns on, there is less back-EMF across the inductor coil 120 and this reduces the LR time constant of inductor 120. Since the input periodic modulation signal to transistor 140 is constant, in terms of period, duty cycle and frequency, transistor 140 is on for the same interval of time as it was when operating at a much lower (ideal) input voltage. Assuming the occurrence of a high input voltage, the inductor 120 charge time is reduced and the transistor 140 on time is constant, the inductor is more likely to reach saturation before transistor 140 turns off. When saturation occurs, the circuit current is limited only by the $\beta$ of transistor 140 and by stray circuit resistance. This condition produces substantial heating which further degenerates the inductor charge time constant. Eventually, the $\beta$ of transistor 140 is changed due to parametric drift and is not sufficient to keep transistor 140 in saturation. In that event, power dissipation within transistor 140 increases and transistor 140 most likely will fail.

SUMMARY OF THE INVENTION

The present invention is intended to overcome the problems of the prior art by providing a closed loop technique for controlling the load impedance of the circuit as seen by the switching transistor in one embodiment and controlling the regulated input voltage to the up-converter in a second embodiment. In both embodiments, the amount of current that is allowed to go through the switching transistor is effectively controlled to prevent excessive heat dissipation and deterioration of the transistor.

It is an object of the present invention to provide an up-converter circuit which more efficiently provides the desired level of output voltage.

It is another object of the present invention to provide an improved up-converter circuit wherein breakdown of the output zener diode element is utilized to control the impedance of the circuit so that it will operate and generate a minimum amount of zener breakdown current.

DESCRIPTION OF THE PREFERRED EMBODIMENTS

Figure 3:
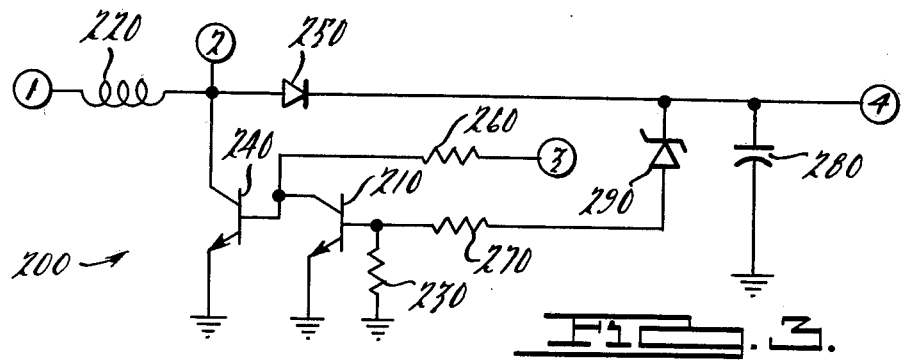
FIG. 3 is a schematic showing of a first embodiment of the present invention utilized to improve the circuit shown in FIG. 1.

The first embodiment of the present invention is circuit 200 shown in FIG. 3 as an improvement of the prior art circuit 100 of FIG. 1. Accordingly, common elements of the two circuits are similarly designated in the last two digits.

Over the first few cycles of operation, the circuit 200 operates in a manner similar to that shown in FIG. 1. However, if the input voltage at terminal 1 is sufficiently high to cause breakdown current to flow in zener diode 290, a voltage is generated in a voltage divider connected between the anode thereof and ground and defined by resistors 270 and 230. A transistor 210 has its base connected to the voltage divider defined by resistors 270 and 230 and provides a variable collector-emitter path to ground. The collector of the transistor 210 is connected to the base of transistor 240. When transistor 210 is biased on by the breakdown voltage of zener diode 290, a voltage divider is established by resistor 260 and the collector-emitter path of transistor 210, thereby reducing the modulation signal voltage present at the base of transistor 240 from terminal 3. The reduction of the drive voltage at transistor 240 thereby limits the current that may be drawn through transistor 240 by the inductor 220. Accordingly, parametric changes in the inductor 220 or the transistor 240 will be held to a minimum due to the prevention of excessive current through the transistor 240.

Figure 4:
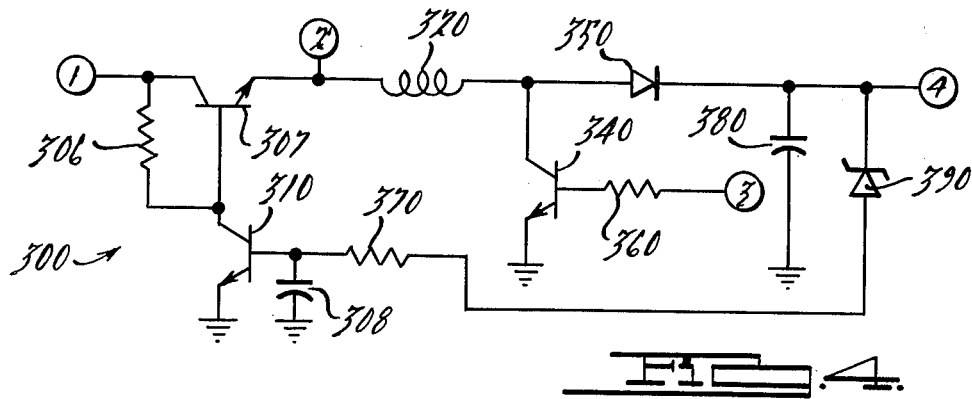
FIG. 4 is a schematic of a second embodiment of the present invention as applied to the circuit illustrated in FIG. 2.

A second embodiment of the present invention is shown in FIG. 4 as circuit 300 adapted to the prior art converter circuit 100' shown in FIG. 2. Circuit 300 controls the DC voltage level input to the inductor 320. In this case, the series regulator circuit of FIG. 2 has zener diode 109 removed therefrom and a transistor 310 is substituted therefore. The collector of the transistor 310 is connected to the junction between the biasing resistor 306 and the base of series regulator transistor 307. The emitter of the transistor 310 is connected to ground to thereby provide a controlled collector-emitter path to ground from the base of transistor 307. The base of transistor 310 is connected through a dropping resistor 370 to the anode of the output zener diode 390. Therefore, when the voltage at output terminal 4 reaches a breakdown value of the zener diode 390, the breakdown current is generated and transistor 310 begins to conduct. Conduction of transistor 310 causes transistor 307 to conduct less and thereby reduce the voltage at junction 2, the input to the inductor 320. At that point, the circuit is self-limiting so as to prevent excessive current from flowing through switching transistor 340 during saturation.

Both of the embodiments of the present invention having the effect of maintaining stability within the circuit by preventing excessive current through the critical components therefore and resulting in a more reliable and efficient power supply.

It will be apparent that many modifications and variations may be effected without departing from the scope of the novel concept of this invention. Therefore, it is intended by the appended claims to cover all such modifications and variations which fall within the true spirit and scope of the invention.

I claim:

1. A DC voltage converter circuit comprising:
   an inductor having two end terminals, a first one of which is connected to receive a first value of DC voltage;
   transistor means connected to the second end terminal of said inductor for alternately providing a low resistance to ground path and a high resistance to ground state at a constant frequency and duty cycle;
   said transistor means having a base connected to a source of constant frequency cyclical voltage to alternately provide said low resistance path and high resistance state;

diode means having its anode connected to said second end terminal of said inductor and its cathode connected to the output terminal of said converter circuit;

a zener diode means having a breakdown threshold voltage characteristic value at a predetermined value higher than said first value of DC voltage, and having its cathode connected to the electrical junction of said cathode of said diode means and said output terminal;

a capacitor means having one terminal connected to the electrical junction of said zener diode means cathode, diode means cathode and said output terminal and having an opposite terminal connected to ground, wherein said capacitor means functions to accumulate charge to a level limited by the avalanche value of said zener diode; and means connected to the anode of said zener diode means for control limiting the amount of current through said transistor means when said transistor means is providing said low resistance path to ground.

2. A DC voltage converter circuit as in claim 1, wherein said control limiting means includes a voltage divider connected between the anode of said zener diode means and ground, and a second transistor means having its base connected to said voltage divider, and having a collector-emitter path connected between the base of said first transistor means and ground.

3. A DC voltage converter circuit as in claim 1, wherein said control limiting means includes a second transistor means having a base-emitter path connected between said anode of said zener diode means and ground, and a collector-emitter path connected to regulate and control the DC voltage level at said first terminal of said inductor.

* * * * *